United States Patent [19]
Berthold

[11] 4,387,594
[45] Jun. 14, 1983

[54] WATER LEVEL INDICATOR HAVING A REMOTE AND A LOCAL READOUT DISPLAY

[75] Inventor: John Berthold, Salem, Ohio

[73] Assignee: The Babcock & Wilcox Company, New Orleans, La.

[21] Appl. No.: 245,871

[22] Filed: Mar. 23, 1981

[51] Int. Cl.³ .................. G01F 23/00; G02B 27/14
[52] U.S. Cl. ............................... 73/293; 350/171
[58] Field of Search ............ 73/293; 350/171, 125, 350/123, 96.3

[56] References Cited

U.S. PATENT DOCUMENTS

| | | | |
|---|---|---|---|
| 1,236,347 | 8/1917 | Pierce | 73/293 |
| 2,573,006 | 10/1951 | Good | 73/293 |
| 3,505,868 | 4/1970 | Goellner | 73/293 |
| 3,602,037 | 8/1971 | Neu | 73/293 X |
| 3,622,786 | 11/1971 | Walker et al. | 350/171 X |
| 3,808,887 | 5/1974 | Buttriss | 73/293 |
| 4,165,915 | 7/1979 | Rau et al. | 350/96.3 X |
| 4,190,320 | 2/1980 | Ferro | 350/125 X |
| 4,232,939 | 11/1980 | Kikuchi | 350/125 X |
| 4,243,299 | 1/1981 | Gliemeroth et al. | 350/96.3 X |
| 4,283,115 | 8/1981 | Fraissl | 350/171 |

*Primary Examiner*—Stephen A. Kreitman
*Assistant Examiner*—David V. Carlson
*Attorney, Agent, or Firm*—Vytas R. Matas; Robert J. Edwards

[57] ABSTRACT

A water level indicating apparatus (10) has an optical system (22) for establishing an optical signal indicative of water level which signal is split by a beam splitter (18) to transmit the majority of the optical signal to a fibre optic cable (16) and to reflect a part of the signal to a proximately located (13) glass diffuser (14). The cable (16) extends to a matte screen (12) at a remote location (11) to thus provide a remote (11) optical signal as well as local (13) optical signal indication of the water level.

4 Claims, 1 Drawing Figure

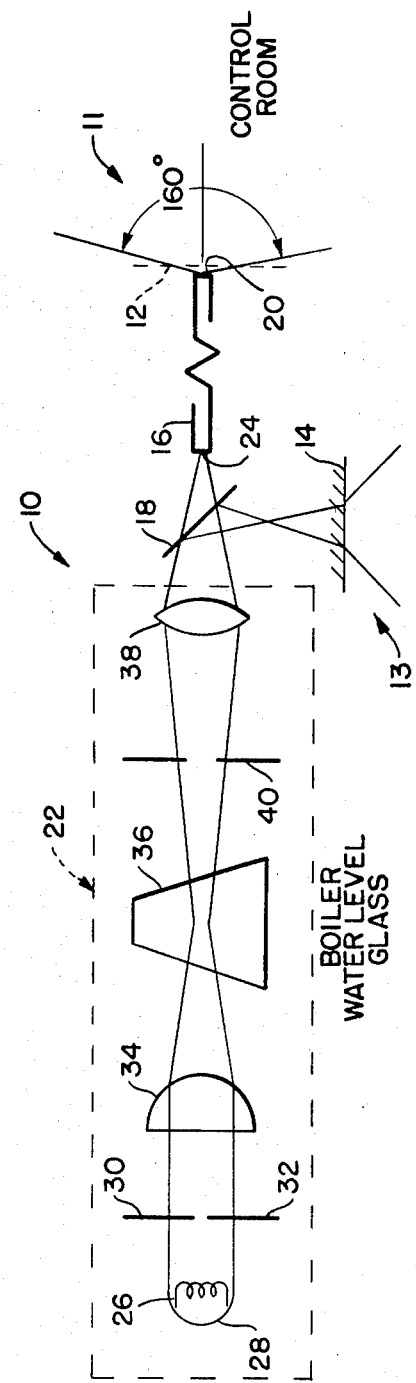

WATER LEVEL INDICATOR HAVING A REMOTE AND A LOCAL READOUT DISPLAY

TECHNICAL FIELD

The present invention relates to water level indicators generally and in particular to water level indicators for boilers which have a remote and a local readout display of the boiler water level.

BACKGROUND ART

Water level indicators having a remote fibre optic readout display are well-known. An example of such a device may be seen in U.S. Pat. No. 3,713,338. In such devices the water level optical signal is focused on one end of a fibre optic assembly and is transmitted along a significant length of the fibre optic assembly to a remote readout area where the other end of the fibre optic assembly terminates.

In certain situations a local readout of the water level signal is desired in addition to the remote readout display. In the past, to provide such a local readout, a short fibre optic assembly was mounted side-by-side with the remote readout fibre optic assembly and the optical signal was focused on both of the fibre optic assemblies. The short fibre optic assembly thus provided the local readout while the second fibre optic assembly of significant length terminating at the remote location provided the remote readout. Applying this system to measure the water level of a boiler required the extended length remote readout fibre optic assembly to extend up to 330 feet to the control room of the power generating plant. The short fibre optic assembly was relatively short since it terminated right at the boiler drum to provide the local readout of boiler water level.

Certain problems arise with such side-by-side fibre optic assemblies to provide local and remote water level readout. Since the same optical signal must be collected by both of the side-by-side fibre optic light guide assemblies, the focal spot which illuminates these assemblies must have optimum size in order that 50 percent of the incident light enter each fibre. Furthermore, thermal variations generated dimensional changes in the mounting hardware of the fibre optic pair further requiring that the focal spot of the optical signal be even larger in area than otherwise required to cover the fibre optic pair to compensate for the thermal induced movements. This resulted in a weak optical signal to the fibre optic pair which signal was then further diminished in the long length loss of the remote readout fibre optic.

SUMMARY OF THE INVENTION

The problems associated with the prior art devices as well as others were solved by the present invention which provides a beam splitter for the optical signal indicative of water level with the beam splitter transmitting the majority of the optical signal to a single fibre optic assembly of extended length which provides the remote readout of the water level signal. A small portion of the optical signal is reflected by the beam splitter directly to a glass diffuser screen which screen provides the local readout of the optical signal indicative of water level.

By eliminating the need for the prior art side-by-side fibre optic assemblies, one for remote readout and the other for local readout, the optical signal indicative of water level is focused directly on the end of the single remote readout fibre optic assembly. This significantly increases the available light provided to the remote readout fibre optic assembly and thus compensates for the losses suffered by the signal going through the extended length of the fibre optic assembly. Further, this allows a more relaxed tolerance on the location of the single fibre optic assembly as opposed to having two fibre optic assemblies in the focal plane of the optical signal. Further, the beam splitter used to transmit the optical signal to the remote readout assembly and the local readout assembly is not limited to splitting the signal into two signals of equal intensity as with the prior art two-cable system. Instead the ratio of transmitted to reflected signal by the beam splitter is made to take into consideration the relative losses of the remote and the local readout assemblies to produce local and remote output signals of relatively equal intensity.

In view of the foregoing, it will be seen that one aspect of the present invention is to provide a water level indicator assembly having a remote and a local readout optical display.

Another aspect of the present invention is to provide a water level indicator assembly having a remote and a local readout display wherein the water level optical signal is proportioned between the remote and the local readout displays depending upon the relative loss of signal in the two displays.

These and other aspects of the present invention will be more clearly understood upon a review of the description of the preferred embodiment when considered with the accompanying drawing.

BRIEF DESCRIPTION OF THE DRAWING

FIG. 1 is a schematic of the water level indicator assembly of the present invention.

DESCRIPTION OF THE PREFERRED EMBODIMENT

Referring now to the drawing wherein the showings are for purposes of describing a preferred embodiment of the present invention and are not intended to limit the invention thereto, an indicator assembly 10 is shown for use in a boiler drum water level indicating assembly. The water level indicator assembly 10 details one port of what is usually a six-port type water level indicator assembly for a boiler drum. Since all six ports of such indictor assemblies are identical, a single port is detailed herein and it will be understood that any number of such ports may be used.

The water level indicator assembly 10 has a remote readout display 11 in the form of a matte screen 12, located in the control room of the power plant from which remote location the actual power plant boiler is controlled. A local readout display 13 is provided by a glass diffuser 14 located proximate to the boiler drum. The glass diffuser 14, rather than the matte screen 12, is used at the boiler drum where a hot dirty environment exists. The glass diffuser 14 spreads the light efficiently over an approximate 90° angle which is sufficient for viewing the level near the boiler drum. Larger angle dispersing elements would not hold up for long time periods in the boiler drum environment where temperatures may exceed 200° F.

The matte screen 12 of the remote readout display 11 is mounted at the end of a fibre optic cable 16 and is used to increase the output angle of the fibre optic assembly 16 from its normal 50° output angle to 160° from the matte screen 12. The 50° field of view of the bare fibre optic cable 16 is insufficient to provide observation of the remote display 11 by a control room operator from many positions in the control room, especially at the panel usually mounted directly below the remote display 11 where boiler feedwater controls are located and where the operator frequently stands. The matte screen 12 is made to have a scattering particle size of 12 $\mu$m. These small particles scatter light efficiently into large angles. Thus, the matte screen 12 is able to increase the viewing area for the operator looking at the matte screen 12 instead of the bare cable. With this increase in viewing angle, the operator at the feedwater control panel can now see the remote display 11.

The fibre optic cable 16 is used to send the water level indication signal from a beam splitter 18 located proximately to the boiler drum to the matte screen 12 which is located in the control room of the power plant. As such, the fibre optic cable 16 usually extends for approximately 330 feet. This extended length of fibre optic cable produces approximately a 40 percent loss of input signal at the exit end 20 of the fibre optic cable 16. The fibre optic cable 16 is thus seen to have a relatively low loss characteristic of approximately 50 db per km as compared to low cost fibre cables which have losses in excess of 500 db per kilometer. The fibre optic cable 16 also has a fibre diameter of 0.6 millimeters which makes the cable 16 relatively flexible while still being a relatively low loss cable.

The optical assembly 22 shown to the left of the signal input end 24 of the fibre optic cable 16 is constructed to achieve maximum power coupling of the water level optical signal to the input end 24 of the cable 16 as well as to provide a highly visible local readout signal at the glass diffuser 14. The optical system 22 consists of a tungsten filament lamp 26 having a built-in reflector 28 that projects a light beam through a side-by-side red filter 30 and a green filter 32. Spaced from the filters 30 and 32 is a low F number lens 34 which focuses an image of the tungsten lamp 26 between the windows of a water level gauge 36 mounted to the boiler drum in a known manner and a coupling lens 38. Located between the water level gauge 36 and the coupling lens 38 is an aperture plate 40 aligned so that either a red or a green beam passes therethrough.

The requirements of the optical system 22 are first to focus onto the front face 24 of the cable 16 an image of the filament image produced by the lens 34, second that the cone of light converging from the coupling lens 38 must be at least as large as the acceptance angle defined by the fibre of the cable 16, and thirdly, that the size of the source image must be at least as large as the fibre of the cable 16. Since both the focal length of the lens 38 as well as the separation between the lens 38 and filament image plane can be chosen there are a number of possible lens 38 choices that will satisfy the recited conditions.

In operation, the light transmitted through the water level gage 36 from the tungsten lamp 26 by virtue of the lens 34 is collected by the focusing lens 38 and is focused through the beam splitter 18 onto the polished input end 24 of the fibre optic cable 16. The beam splitter transmits approximately 85 percent of the light from the focusing lens 38 onto the input end 24 of the cable 16. Approximately 15 percent of the light from the focusing lens 38 is reflected 90° to the optical axis by the beam splitter 18 onto the glass diffuser 14. The beam splitter is oriented at 45° to the optical axis to enable the glass diffuser 14 to be located with its perpendicular centerline at 90° to the optical axis. This ratio of transmitted to reflected light may be provided by selective silvering of the beam splitter and/or angular rotation of the beam splitter 16. The rotation and silvering would compensate for the large signal loss of the cable 16 to insure the remote readout 11 will have a highly visible optical signal. The glass diffuser is mounted on the side panel of an assembly which is normally attached to the water level gage 36 to thus provide the local visual indication of water level at the boiler drum.

In view of the foregoing, it will be seen that the applicant's invention provides a boiler water level indicating assembly which appropriately apportions the optical signal indicative of water level in the boiler between a high loss, remote readout display and a relatively low loss, local display to thus provide highly visible optical displays for both the remote and local displays.

Certain modifications and improvements will occur to those skilled in the art upon reading this specification. It will be understood that all such improvements and modifications have been deleted herein for the sake of conciseness and readability but are properly covered within the scope of the following claims.

I claim:

1. A liquid level gauge assembly for providing a remote and a local optical display of the liquid level in a boiler comprising:
    optical means mounted proximately to the boiler for producing an optical signal indicative of liquid level in the boiler;
    a beam splitter located proximate to said optical means to divide the optical liquid level signal of said optical means into a first and second optical signal;
    a fibre optic cable having one end located proximately to said beam splitter and being used to transmit said first optical signal from said beam splitter to a boiler control location remote from said beam splitter and the boiler; and
    display means located proximately to said beam splitter to display said second optical signal from said beam splitter in the area of the boiler.

2. A liquid level gauge assembly as set forth in claim 1 wherein said beam splitter splits approximately 85 percent of said water level signal into said first optical signal and approximately 15 percent of said water level signal into said second optical signal.

3. A liquid level gauge assembly as set forth in claim 1 wherein said fibre optic cable includes a matte screen mounted on the end of said fibre optic means for increasing the viewing angle of said first optical signal at the remote location.

4. A liquid level gauge assembly as set forth in claim 3 wherein said fibre optic means includes a fibre optic cable having a relatively low signal loss of 50 db/km or less.

* * * * *